United States Patent [19]

Masuda et al.

[11] Patent Number: 4,998,512

[45] Date of Patent: Mar. 12, 1991

[54] EXHAUST PORT CONTROL SYSTEM FOR TWO STROKE ENGINE

[75] Inventors: Tatsuyuki Masuda; Toshikazu Ozawa, both of Iwata, Japan

[73] Assignee: Yamaha Hatsudoki Kabushiki Kaisha, Iwata, Japan

[21] Appl. No.: 470,964

[22] Filed: Jan. 26, 1990

[30] Foreign Application Priority Data

Feb. 1, 1989 [JP] Japan .................... 1-20821

[51] Int. Cl.[5] .................... F02B 27/06; F02B 25/20
[52] U.S. Cl. .................... 123/65 PE; 123/80 BA; 123/323
[58] Field of Search .............. 123/65 R, 65 PE, 65 V, 123/65 EM, 323, 190 R, 190 A, 80 R, 80 BA, 80 BB

[56] References Cited

U.S. PATENT DOCUMENTS

| | | | |
|---|---|---|---|
| 2,154,975 | 4/1939 | Dufour | 123/65 A |
| 2,349,305 | 5/1944 | Pyk | 123/65 A |
| 2,477,712 | 8/1949 | Anderson | 123/65 A |
| 2,720,872 | 10/1955 | Yokoi . | |
| 2,735,260 | 2/1956 | Laubender | 123/65 A |
| 3,059,626 | 10/1962 | Froehlich et al. | 123/65 A |
| 4,121,552 | 10/1978 | Mithuo et al. | 123/65 A |
| 4,541,371 | 9/1985 | Kageyama et al. | 123/190 A |
| 4,621,596 | 11/1986 | Uchinishi | 123/65 V |
| 4,622,928 | 11/1986 | Uchinishi | 123/65 PE |
| 4,787,344 | 11/1988 | Okumura et al. | 123/65 PE |

FOREIGN PATENT DOCUMENTS

| | | | |
|---|---|---|---|
| 0145479 | 12/1984 | European Pat. Off. . | |
| 282930 | 9/1913 | Fed. Rep. of Germany . | |
| 363520 | 11/1922 | Fed. Rep. of Germany . | |
| 0035024 | 2/1987 | Japan | 123/65 PE |
| 0253114 | 10/1988 | Japan | 123/65 PE |

*Primary Examiner*—David A. Okonsky
*Attorney, Agent, or Firm*—Ernest A. Beutler

[57] ABSTRACT

A two cycle crankcase compression diesel engine having a supplemental exhaust port system that is formed in a straight line perpendicular to the cylinder bores and which intersects the main exhaust ports. An exhaust control valve arrangement is provided for controlling the flow through the supplemental exhaust ports to reduce the compression ratio under high load, high speed running conditions. The supplemental exhaust control valves comprise a plurality of individual valves each contained within a common bore extending through the cylinder and interconnected by connecting members that permit axial and circumferential misalignment so as to accommodate for distortion and avoid sticking of the valves.

10 Claims, 5 Drawing Sheets

EXHAUST PORT CONTROL SYSTEM FOR TWO STROKE ENGINE

BACKGROUND OF THE INVENTION

This invention relates to an exhaust port control system for a two stroke engine and more particularly to an improved, simplified and easily manufactured arrangement for reducing the compression ratio of a two stroke engine under certain running conditions.

It has been well known to provide some structure for reducing the compression ratio of a two cycle engine for a variety of purposes. This can be done either for starting or so as to limit the compression pressure in a diesel engine under high load running. A variety of decompression devices have been provided for these various purposes. One type of decompression device that has been proposed and which is usable in reducing the compression ratio of a diesel two cycle engine under high load operation employs a supplemental exhaust port that opens into the cylinder bore at a level so that it will open before the main exhaust port. An exhaust control valve is provided in the supplemental exhaust port so that the supplemental exhaust port can be closed under running conditions when its use is not necessary. For example, this type of control valve is opened under high load running so as to reduce the compression ratio and protect the life of the engine.

In the devices of this type which have been previously proposed, the supplemental exhaust port intercepts the main exhaust port so that the exhaust gases from the supplemental port can pass into the common exhaust manifold of the main exhaust system. However, this type of arrangement results in the provision of a complicated passageway for the supplemental exhaust port and one which can offer high flow resistance and, accordingly, deteriorate the performance.

It is, therefore, a principal object of this invention to provide an improved, simplified and lost cost exhaust port control system for a two stroke engine.

It is a further object of this invention to provide an improved and simplified supplemental exhaust port system for a two stroke engine that can be easily and conveniently manufactured and which will not detract from the performance.

It is a further object of this invention to provide a supplemental exhaust port system for a two stroke engine wherein the supplemental exhaust port will offer a low flow resistance and high efficiency and can be inexpensively manufactured.

SUMMARY OF THE INVENTION

This invention is adapted to be embodied in an exhaust port system for a two cycle internal combustion engine having a cylinder, a piston reciprocating within the cylinder and a main exhaust port that extends through the cylinder for delivering exhaust gases from the cylinder to the atmosphere. A supplemental exhaust port also extends through the cylinder and intersects the main exhaust port for delivering exhaust gases from the cylinder to the main exhaust port. The supplemental exhaust port is straight and an exhaust control valve controls the flow through the supplemental exhaust port.

DETAILED DESCRIPTION OF THE PREFERRED EMBODIMENT OF THE INVENTION

Figure 1:
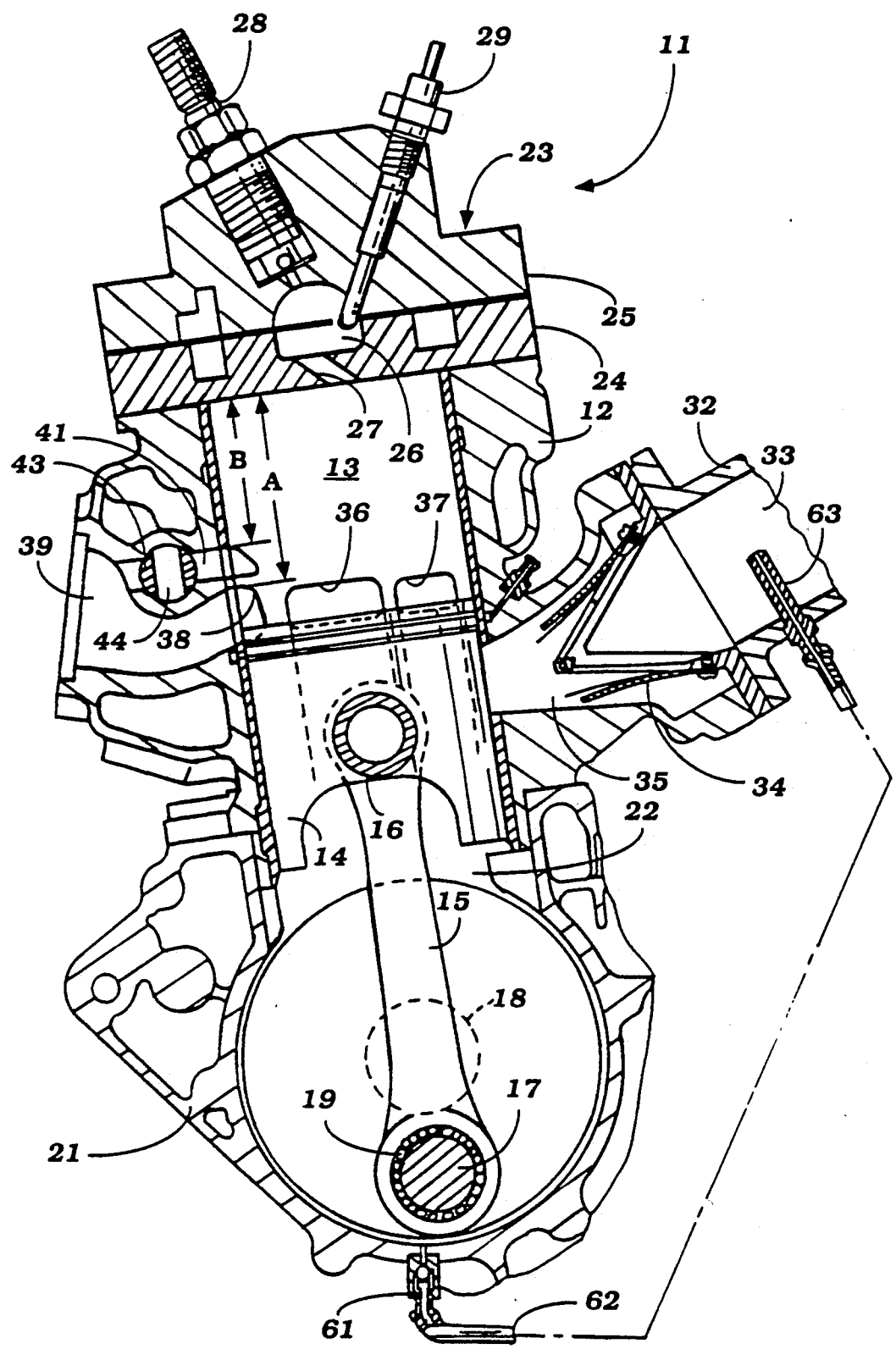
FIG. 1 is a cross sectional view taken through a single cylinder of a multiple cylinder two stroke diesel engine constructed in accordance with an embodiment of the invention.

Referring in detail to the drawings of a three cylinder, two cycle, crankcase compression, diesel engine identified generally by the reference numeral 11. Although the engine 11 is of this configuration, it should be readily apparent to those skilled in the art how the invention can be practiced in conjunction with engine s having any type of cylinder configuration or number of cylinders.

The engine 11 is comprised of a cylinder block 12 having three aligned cylinder bores in which pressed in cylinder liners 13 are provided. A piston 14 is supported for reciprocation in each cylinder liner and is connected to the upper end of a connecting rod 15 by means of a piston pin 16. The lower end of the connecting rod 15 is connected to a throw 17 of a crank shaft 18 by means of a suitable bearing assembly, a roller bearing type assembly 19 is utilized in the depicted embodiment. The crankshaft 18 is supported for rotation relative to the cylinder block 12 and to a crankcase 21 that is affixed to the cylinder block in a known manner.

A crankcase chamber 22 is formed below the piston 14. As is conventional in this type of engine, the individual crankcase chambers 22 associated with each of the cylinder bores 13 are sealed from each other in an appropriate manner.

A cylinder head assembly, indicated that generally by the reference 23 and comprised of a lower spacer plate 24 and a main portion 25 are affixed to the cylinder block 12 in an appropriate manner. The spacer plate 24 and main portion 25 form a swirl type pre-chamber 26 that communicates with the main chamber formed above the head of the piston 14 through a throat section 27.

A fuel charge is admitted to the pre-chamber 26 by an injection nozzle 28 that is affixed to the cylinder head assembly 23 in a known manner. A glow plug assembly 29 is also affixed to the head assembly 23 and extends into the pre-chamber 26 for at least starting operation.

An air charge indicated is delivered to the crankcase chambers 22 by means including an intake manifold 32 having individual intake passages 33 each serving a respective one of the chambers 22. A reed type check valve assembly, indicated generally by the reference numeral 34 is clamped between the intake manifold 32 and an intake passage 35 formed in the cylinder block 12 and which communicates at its downstream end with the crankcase chamber 22 when the piston 15 is above its bottom dead center position by a more than a predetermined amount.

The air charge which has been admitted to the crankcase chambers 22 is compressed therein and is then transferred by a plurality of scavenge or transfer passages 36 and 37 to the area above the piston 14 through respective scavenge ports. At the appropriate position, fuel is injected into the pre-chamber 26 from the nozzle 28 and will burn and then issue into the main combustion chamber for expansion. The burnt charge is then discharged to the atmosphere through one or more main exhaust ports 38 formed in the cylinder liner 13 and which communicates with exhaust passages 39 formed in the cylinder block 12.

Figure 3:
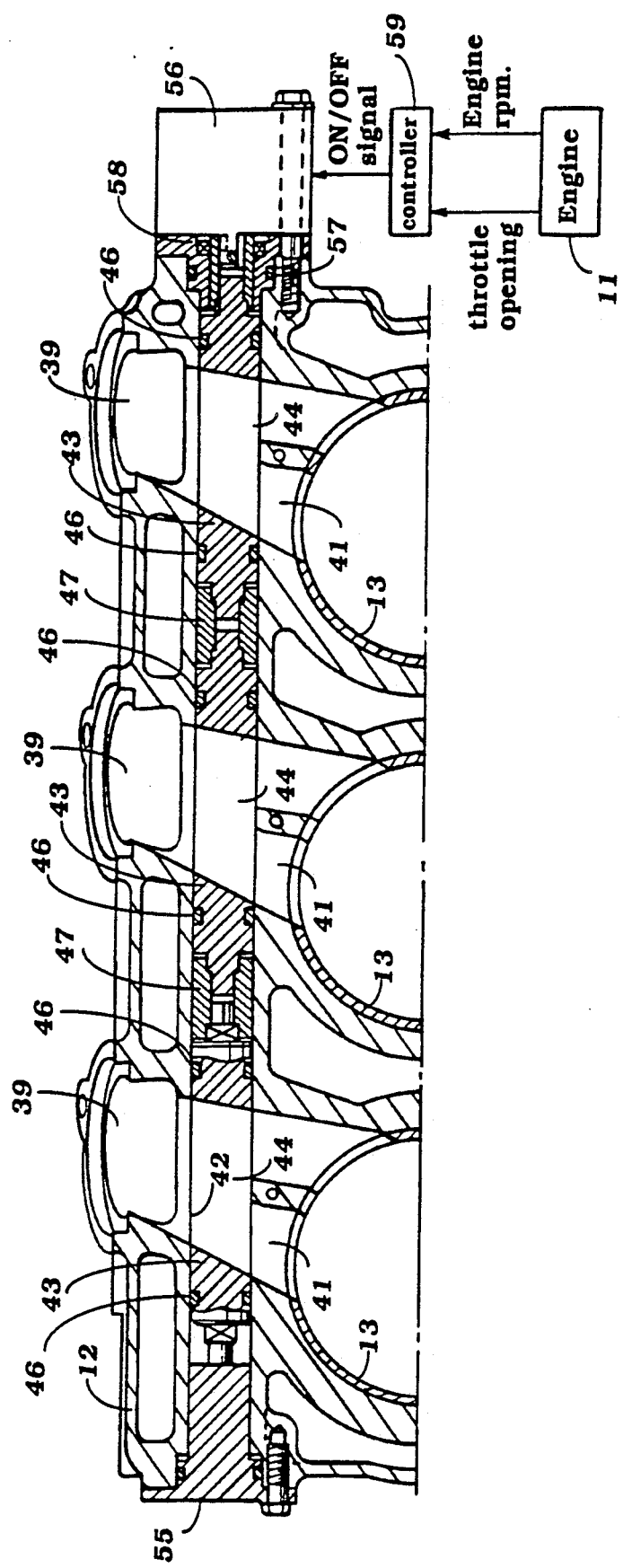
FIG. 3 is a cross sectional view taken along the line 3—3 of FIG. 2 and shows the supplemental exhaust port and exhaust control system.

It will be noted that the exhaust passage 39 curves somewhat downwardly from the exhaust port 38 and then opens in a wider mouth section that extends upwardly above the exhaust port 38. The top edge of the exhaust port 38 is disposed at a distance A below the lower surface of the cylinder head so as to give a relatively high effective compression ratio for diesel operation. Specifically, this compression ratio may be in the range of about 20 to 1. Although such a high compression ratios advantageous for starting and under low speed operation too high of a compression ratio can offer deteriorated engine performance under high load conditions and high speed conditions. In order to provide an effective arrangement for lowering the compression ratio under these conditions, the engine 11 is also provided with an auxiliary or sub-exhaust port 41 which is disposed at a lesser distance B from the lower surface of the cylinder head 23 so as to provide a reduced compression ratio. The auxiliary or subexhaust port 41 may be conveniently formed by a machining operation through the opening of the main exhaust passage 39 and the passage 41 can extend in a generally perpendicular direction to the axis of the associated cylinder bore 1. As a result, these ports can conveniently be machined by a cutting tool passing through the exhaust port and have a generally tapered configuration from their inlet end to the outlet end as shown in FIG. 3. It should be noted that the ports 41 communicate the cylinder bore with the exhaust passages 39 prior to their exit from the cylinder block. Because of their straight configuration, not only can the auxiliary exhaust ports 41 be conveniently formed but also they will have a very low flow resistance and hence high efficiency.

Figure 2:
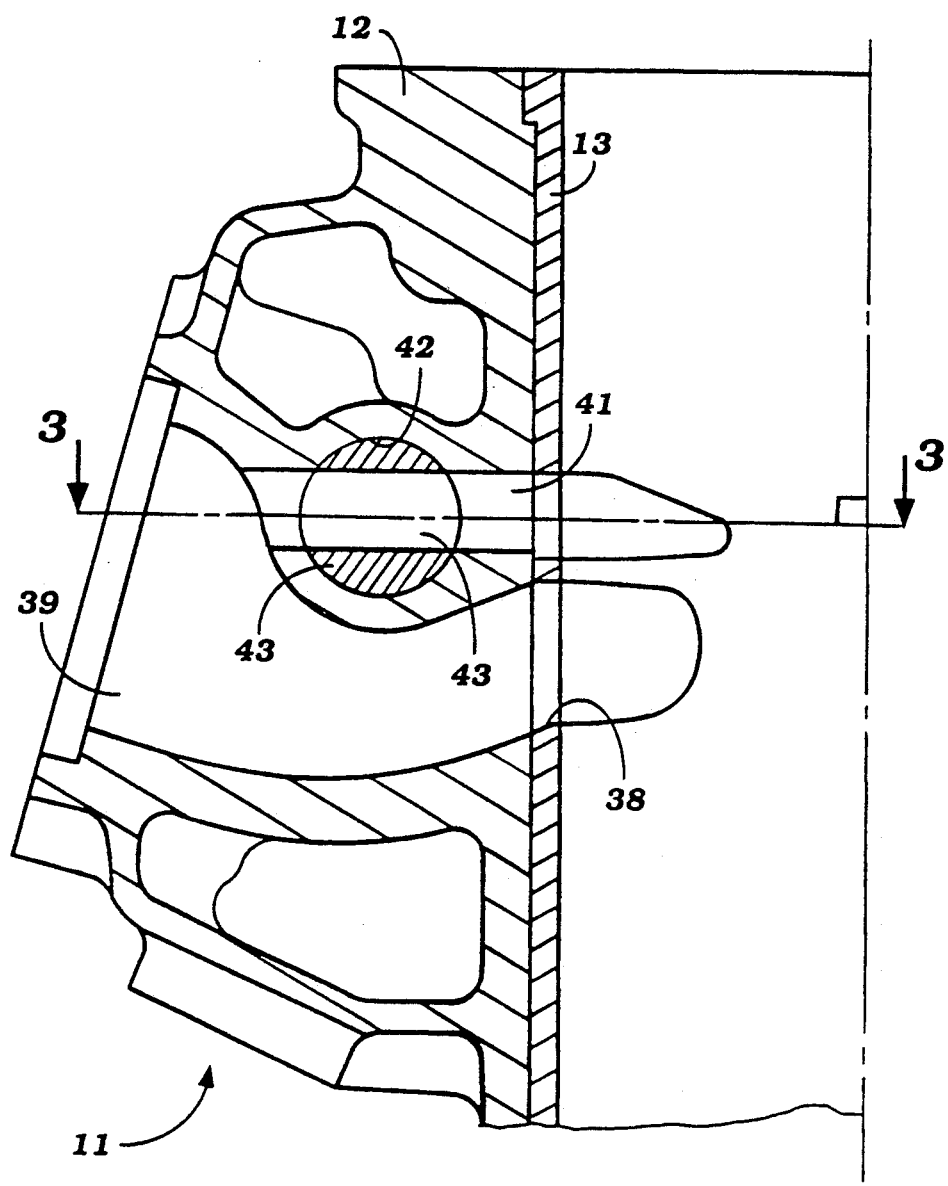
FIG. 2 is an enlarged cross sectional view taken through the exhaust port.

In order to control the opening and closing of the auxiliary exhaust ports 41 there is provided a control valve assembly for each auxiliary exhaust port 41 but these control valves are all interrelated in a matter to be described. In order to accommodate these exhaust control valves, the cylinder block is provided with a transversely extending bore 42 that extends parallel to the axis of rotation of the crankshaft. The bore 42 intersects the auxiliary exhaust passages 41 and has a larger diameter than the height of these passages. Individual control valve elements 43 are rotatably journalled within the bore 42 at each auxiliary exhaust port 41. The control valves 43 have a generally cylindrical configuration and are defined with an opening 44 that has a generally oval configuration when viewed at the side as may be best seen in FIG. 4. When the valves 43 are moved to the position shown in FIG. 2, they will be open and substantially unrestricted flow can pass through the auxiliary exhaust port 41. When the valves 43 are rotated through 90 degrees to their closed position (FIG. 1), they will substantially preclude any flow through the auxiliary exhaust ports 41.

The valves 43 have grooves 45 formed at the opposites sides of the openings 44 and 0-ring seals 46 are provided in these grooves for effecting sealing against side leakage.

Figure 4:
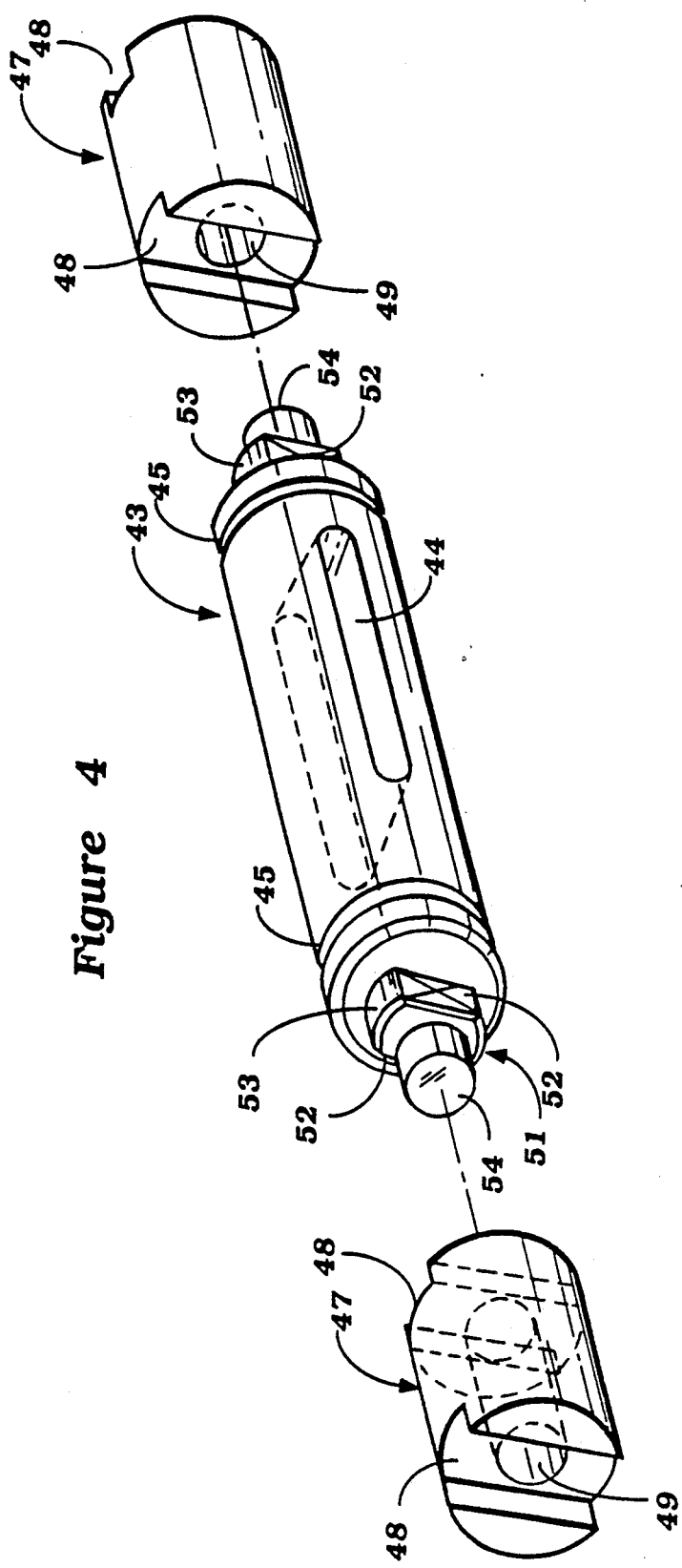
FIG. 4 is an exploded perspective view of one of the exhaust control valves and the interconnecting members that interrelated to the other exhaust control valves.

It should be noted that the configuration of the bore 42 can readily distort due to torque down of the cylinder head 25, heat loading and other factors. For that reason, it is desirable to utilize a plurality of individual valve segments 43 rather than one long valve which might bind in operation under these circumstances. In order to ensure that the valves 43 will all operate in unison, however, adjacent valves 43 are interconnected by connecting members, indicating generally by the reference numeral 47 and having a construction as best seen in FIG. 4.

Each connecting member 47 has a generally cylindrical configuration and is formed with a formed of slots 48 that extend across their ends. A bore 49 extends transversely through the connecting members 48.

Each valve member 43 has at its opposite ends a section 51 that has a pair of straight sides 52 which are interconnected at their opposite ends by curved sides 53. The distance between the sides 52 is slightly less than the width of the slots 48 so as to afford some clearance to accommodate misalignment due to the aforenoted factors. In addition, a cylindrical post 54 extends from the sections 51 and is received in the bores 49 with some clearance so as to allow axial and circumferential movement. As a result, the connection between the valve members 43 provided by the connecting members 47 will insure that the valve members 43 all move substantially in unison but circumferential and axial tolerance is accommodated. Since the valve members only operate in a fully opened or a fully closed position, the permitted relative circumferential movement presents no problem.

At one end the bore 42 of the cylinder block is closed by a closure plug 55 that bears against the cylindrical projection 54 of the adjacent valve member 43. At the other end, there is provided a controller, indicated generally by the reference numeral 56 which is in the form of a stepping motor or the like. The motor 56 is connected by means of a coupling 57 which may be similar to the connecting members 47 to one end of the one of the valve elements 43. A seal 58 encircles the coupling and provides sealing.

The motor 56 is controlled by means of a controller 59 that is programmed so as to provide an on/off signal to operate the motor 56 and open and close the valve 43 as aforedescribed. The controller 59 receives parameters from the engine indicative of engine speed and throttle valve opening by suitable sensors and is programmed so as to open and close the exhaust control valves 43 in accordance with a program whereby under low speed, low load conditions the valves 43 are closed to provide a high compression ratio as aforenoted. However, when the valves are open at the point indicated in FIG. 6 as the point a, then the compression ratio will be lowered to approximately 15 to 1 with the results now to be described.

Figure 5:
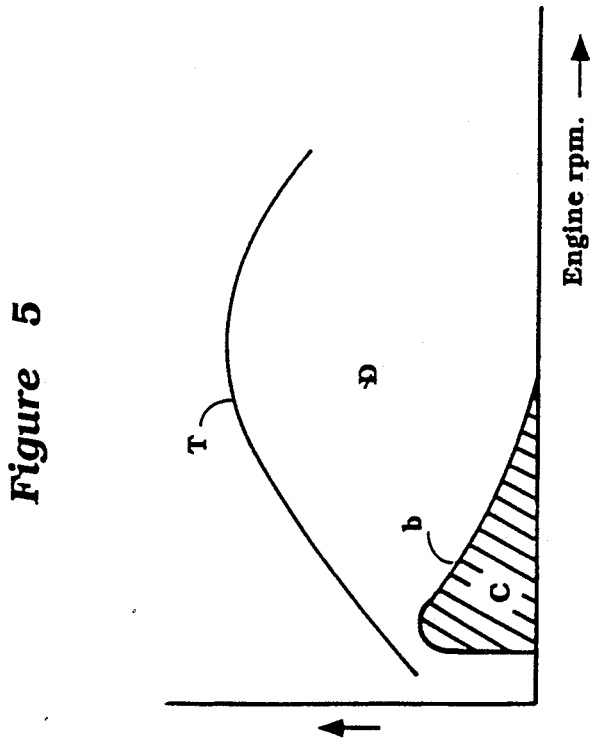
FIG. 5 is a graphical view showing the torque curve of the engine in relation to engine speed and also the timing of the opening and closing of the supplemental exhaust port relative to these characteristics.

The sequence of timing of the valves 43 is illustrated in FIG. 5 by the curve b that shows the range C when the control valves 43 are closed. As may be seen, if the engine load increases and the engine speed increases, the valves 43 will be moved from their closed position to their opened position. This provides torque curve as shown by the curve T in this figure.

Figure 6:
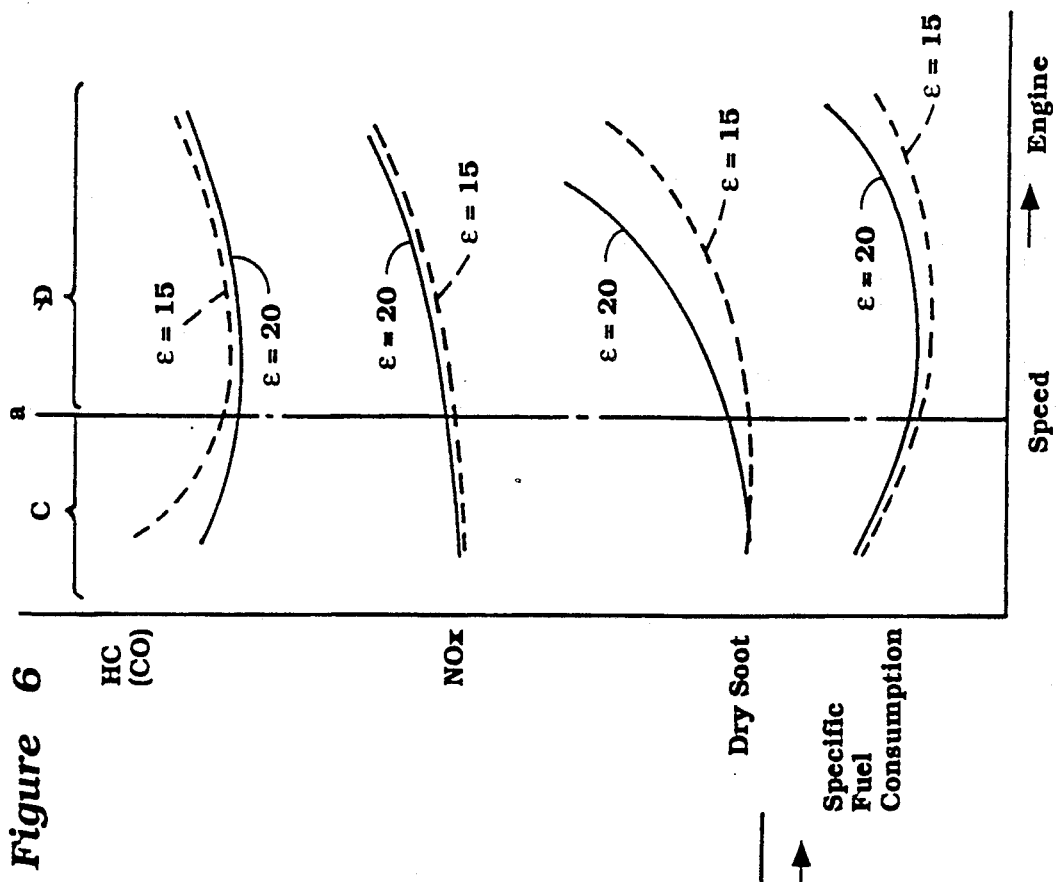
FIG. 6 is a graphical view showing the hydrocarbon or CO emissions, NOX emissions, dry soot emissions and specific fuel consumption for engines having varying compression ratios or with the valve open and closed.

Under this condition, the valves are maintained in their open position so as to lower the compression ratio the effects of which may be understood by reference to FIG. 6 wherein HC or CO, NOX, dry soot and specific fuel consumption are shown in relation to engine speed with the point a depicting the point at which the control valve operates. Hence, under the range of operation C the control valve will be closed and it will be noted from the solid line curves that CO or hydrocarbon emissions can be kept low without offering significant problems with NOX or dry soot emissions or high specific fuel consumption. However, as the speed and/or load increases, the performance characteristics at high compression ratio deteriorate in that dry soot and specific fuel consumption will begin to increase steeply. Therefore, under these conditions, the control valves 43 are opened and improved performance will result. Thus, the performance is increased through the use of the control valves.

Referring again to FIG. 1, it has already been noted that the engine is equipped with reed type valves 36. Inasmuch as the induction system only flows air, the reed type valves can cause noise under their closing and opening operation. To avoid this noise, a small amount of lubricant which may collect in the crankcase chambers is delivered through a check valve assembly 61 to a conduit 62 that extends to a spray nozzle 63 that is positioned in the intake manifold 32 upstream of the check valve 34. The engine 11 is provided with a suitable separate lubricating system and some lubricant and/or fuel will accumulate in the crank case chambers. This fuel will be drawn by the reduced pressure in the induction system and sprayed to the nozzle 63 to coat the cage and valve members of the check valve 34 and provide some damping and silencing. Of course, the amount of lubricant so delivered is quite small and will not have the deleterious effects of causing smoke in the exhaust.

From the foregoing description it should be readily apparent that the described control valve assembly permits extremely good operation under all running conditions and the auxiliary exhaust port arrangement can be conveniently and simply manufactured and will offer very low flow resistance because the auxiliary exhaust ports are straight passages extending perpendicularly to the cylinder bore. Of course, the foregoing description is that of a preferred embodiment of the invention and various changes and modifications may be made without departing from the spirit and scope of the invention as defined by the appended claims.

We claim:

1. In an exhaust port system for a two cycle internal combustion engine having a cylinder block having a cylinder bore, a piston reciprocating within said cylinder bore, a main exhaust port opening into said cylinder bore at the end of a main exhaust passage extending through said cylinder block for delivering exhaust gases from said cylinder bore to the atmosphere through a discharge opening, said exhaust passage increasing in cross sectional area from said exhaust port to said discharge opening to define a transverse projection of said cylinder block extending into said exhaust passage, a supplemental exhaust passage extending from a supplemental exhaust port in said cylinder bore through said cylinder block transverse projection and intersecting said main exhaust passage for delivering exhaust gases from said cylinder bore to said main exhaust passage, said supplemental exhaust passage being a straight passage aligned with said discharge opening, and an exhaust control valve supported with said transverse projection for controlling the flow through said supplemental exhaust port.

2. In an exhaust port system for a two cycle internal combustion engine as set forth in claim 1, wherein the supplemental exhaust port opens into the cylinder bore closer to a cylinder head than the main exhaust port.

3. In an exhaust port system for a two cycle internal combustion engine as set forth in claim 2, wherein the supplemental exhaust passage extends perpendicularly to the cylinder bore.

4. In an exhaust port system for a two cycle internal combustion engine as set forth in claim 3, wherein the main exhaust passage curves around said transverse projection of the cylinder block toward the cylinder head so as to be intersected by the supplemental exhaust passage.

5. In an exhaust port system for a two cycle internal combustion engine as set forth in claim 1, wherein the supplemental exhaust passage extends perpendicularly to the cylinder bore.

6. In an exhaust port system for a two cycle internal combustion engine as set forth in claim 5, wherein the main exhaust passage curves around said transverse projection of the cylinder block toward the cylinder head so as to be intersected by the supplemental exhaust passage.

7. In an exhaust port system for a two cycle internal combustion engine as set forth in claim 6, wherein the supplemental exhaust passage is formed by a machining operation with a cutting tool passing through the discharge opening of the main exhaust passage.

8. In an exhaust port system for a two cycle internal combustion engine as set forth in claim 1, wherein there are a plurality of aligned cylinder bores and there is provided a supplemental exhaust passage and exhaust control valve for each supplemental exhaust passage.

9. In an exhaust port system for a two cycle internal combustion engine as set forth in claim 8, wherein the exhaust control valves comprise a plurality of cylindrical members each supported in a common bore extending through the transverse projection of the cylinder blocks.

10. In an exhaust port system for a two cycle internal combustion engine as set forth in claim 9 further including connecting means for connecting said exhaust control valves and permitting axial and circumferential movement therebetween for accommodating for misalignments and distortion.

* * * * *